United States Patent
Yamazaki

(10) Patent No.: US 10,016,862 B2
(45) Date of Patent: Jul. 10, 2018

(54) MEASUREMENT APPARATUS, CALCULATION METHOD, SYSTEM, AND METHOD OF MANUFACTURING ARTICLE

(71) Applicant: CANON KABUSHIKI KAISHA, Tokyo (JP)

(72) Inventor: Tsuyoshi Yamazaki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/168,656

(22) Filed: May 31, 2016

(65) Prior Publication Data

US 2016/0346882 A1   Dec. 1, 2016

(30) Foreign Application Priority Data

Jun. 1, 2015 (JP) ................... 2015-111678
Apr. 25, 2016 (JP) ................... 2016-087389

(51) Int. Cl.
| | | |
|---|---|---|
| G01B 11/24 | (2006.01) | |
| B23P 19/04 | (2006.01) | |
| G01B 11/25 | (2006.01) | |
| B25J 19/02 | (2006.01) | |
| G06T 1/00 | (2006.01) | |
| G06T 7/521 | (2017.01) | |

(52) U.S. Cl.
CPC ............. B23P 19/04 (2013.01); B25J 19/023 (2013.01); G01B 11/25 (2013.01); G01B 11/2513 (2013.01); G06T 1/0014 (2013.01); G06T 7/521 (2017.01)

(58) Field of Classification Search
CPC ..... B23P 19/04; G01B 11/25; G01B 11/2513; B25J 19/023; G06T 1/0014; G06T 7/0057; G06T 7/521

USPC ................................................. 356/600–613
See application file for complete search history.

(56) References Cited

U.S. PATENT DOCUMENTS

| | | |
|---|---|---|
| 2002/0005956 A1 | 1/2002 | Kiyoi |
| 2009/0046301 A1* | 2/2009 | Asakura ................ G01B 11/24 356/610 |
| 2012/0316820 A1 | 12/2012 | Nakazato et al. |
| 2014/0063192 A1 | 3/2014 | Sonoda et al. |
| 2014/0118539 A1 | 5/2014 | Ota et al. |
| 2016/0102972 A1 | 4/2016 | Kobayashi |

OTHER PUBLICATIONS

European Search Report issued in European Application No. EP16001151.6, dated Sep. 20, 2016.
Nayar et al. "Fast Separation of Direct and Global Components of a Scene Using High Frequency Illumination" SIGGRAPH, Jul. 2006.

* cited by examiner

*Primary Examiner* — Tri T Ton
(74) *Attorney, Agent, or Firm* — Rossi, Kimms & McDowell LLP

(57) ABSTRACT

The present invention provides a measurement apparatus for measuring a shape of an object to be measured, including a processing unit configured to obtain information on the shape of the object to be measured based on an image obtained by imaging the object to be measured onto which pattern light alternately including a bright portion and a dark portion along a first direction is projected, wherein the processing unit obtains a plurality of first signals different from each other and indicating a light intensity distribution in a second direction intersecting the first direction, from a region of the image, which corresponds to the dark portion.

17 Claims, 8 Drawing Sheets x=0 x=0

— — — — SURFACE SCATTERING SIGNAL IN BRIGHT PORTION
- - - - - - - - - - INTERNAL SCATTERING SIGNAL IN BRIGHT PORTION
— — — — — MEASUREMENT SIGNAL IN DARK PORTION
——————— MEASUREMENT SIGNAL IN BRIGHT PORTION

– – – – – SURFACE SCATTERING SIGNAL IN BRIGHT PORTION
---------- INTERNAL SCATTERING SIGNAL IN BRIGHT PORTION
— - — - — MEASUREMENT SIGNAL IN DARK PORTION
———— MEASUREMENT SIGNAL IN BRIGHT PORTION

– – – – – SURFACE SCATTERING SIGNAL IN BRIGHT PORTION
---------- INTERNAL SCATTERING SIGNAL IN BRIGHT PORTION
— - — - — MEASUREMENT SIGNAL IN DARK PORTION
———— MEASUREMENT SIGNAL IN BRIGHT PORTION

MEASUREMENT APPARATUS, CALCULATION METHOD, SYSTEM, AND METHOD OF MANUFACTURING ARTICLE

BACKGROUND OF THE INVENTION

Field of the Invention

The present invention relates to a measurement apparatus for measuring the shape of an object to be measured, a calculation method, a system, and a method of manufacturing an article.

Description of the Related Art

There is a known measurement apparatus which projects line pattern light such as that of a space coding method onto an object to be measured via a projecting unit such as a projector, and obtains three-dimensional coordinates from the principle of triangulation based on the position of reflected light obtained by an imaging unit. In this measurement apparatus, the measurement result is readily influenced by the material of an object to be measured.

For example, a resin is sometimes handled as an object to be measured in the field of industrial production. When an object to be measured is a resin, light projected onto the object to be measured enters the interior of the object and is scattered in it, that is, so-called internal scattering occurs. If this internal scattering occurs, the reflected light from the object to be measured contains internal scattered light from the interior of the object, in addition to surface scattered light from the surface of the object. Since the internal scattered light contains scattered light at a distance different from that of the surface scattered light, the measurement apparatus calculates a measurement value different from that of the surface position of the object. Therefore, the internal scattered light appears as a systematic error in the measurement apparatus, and decreases the measurement accuracy.

Accordingly, a technique for reducing the influence of internal scattering is proposed in "S. K. Nayer et al. Fast Separation of Direct and Global Components of a Scene Using High Frequency Illumination. SIGGRAPH July, 2006." (literature 1). In this technique, pattern light including bright and dark portions and having a spatially high frequency is projected onto a resin as an object to be measured, and the intensity distribution in the dark portion containing an internal scattering component is subtracted from the intensity distribution in the bright portion containing a surface scattering component and the internal scattering component. As described above, literature 1 describes that reducing the internal scattering component from the intensity distribution in the bright portion makes it possible to reduce an error (systematic error) by which three-dimensional coordinates obtained by the measurement apparatus systematically shift in the direction of the interior of an object to be measured.

Unfortunately, literature 1 has no practical disclosure concerning the relationship between the spatial frequency of the pattern light and the internal scattering or surface scattering. For example, when the spatial frequency of the pattern light is low, the intensity distribution in the dark portion contains no internal scattering component, so the internal scattering component contained in the intensity distribution in the bright portion cannot properly be removed. On the other hand, when the spatial frequency of the pattern light is high, the bright portion spatially expands when an optical point image intensity distribution containing defocusing is taken into account, so the intensity distribution in the dark portion contains the surface scattering component. If the intensity distribution in the dark portion is subtracted from that in the bright portion, therefore, the surface scattering component is also subtracted from the intensity distribution in the bright portion, so the internal scattering component cannot properly be removed. As described above, literature 1 cannot always optimally reduce the influence of internal scattering in an object to be measured, that is, the systematic error which decreases the measurement accuracy of the measurement apparatus.

SUMMARY OF THE INVENTION

The present invention provides a measurement apparatus advantageous in accurately measuring the shape of an object to be measured.

According to one aspect of the present invention, there is provided a measurement apparatus for measuring a shape of an object to be measured, including a processing unit configured to obtain information on the shape of the object to be measured based on an image obtained by imaging the object to be measured onto which pattern light alternately including a bright portion and a dark portion along a first direction is projected, wherein the processing unit obtains a plurality of first signals different from each other and indicating a light intensity distribution in a second direction intersecting the first direction, from a region of the image, which corresponds to the dark portion, obtains evaluation values indicating evaluation of a plurality of corrected signals obtained by correcting, by using the plurality of first signals, a second signal which is obtained from a region of the image, which corresponds to the bright portion, and represents a light intensity distribution in the second direction, and obtains the information by using a corrected signal having the evaluation value falling within an allowable range.

Further aspects of the present invention will become apparent from the following description of exemplary embodiments with reference to the attached drawings.

DESCRIPTION OF THE EMBODIMENTS

Figure 1:
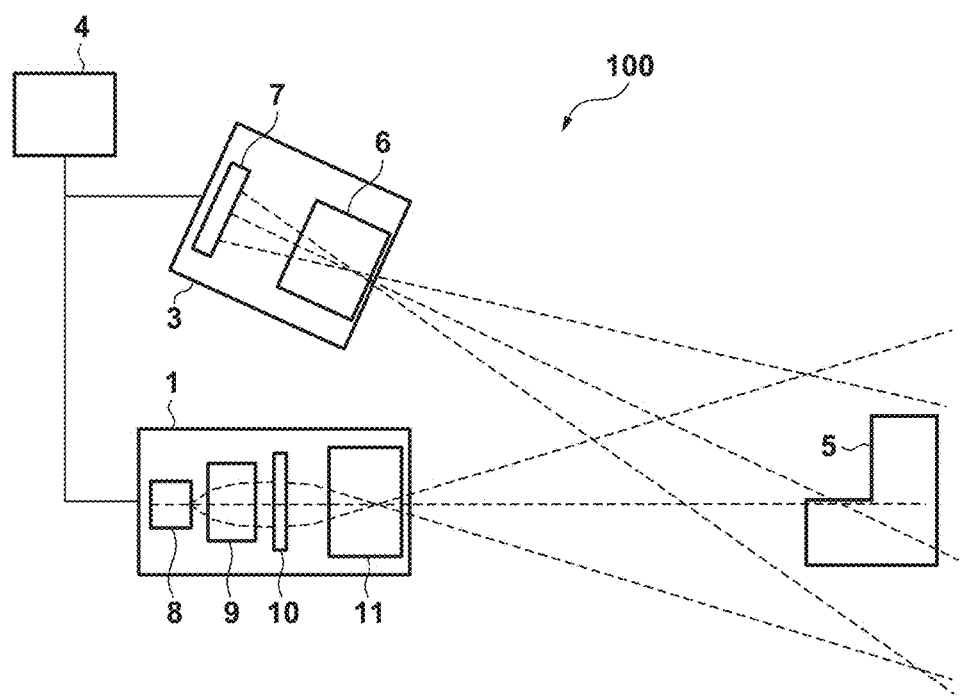
FIG. 1 is a schematic view showing the arrangement of a measurement apparatus as an aspect of the present invention.

Preferred embodiments of the present invention will be described below with reference to the accompanying drawings. Note that the same reference numerals denote the same members throughout the drawings, and a repetitive description thereof will not be given.

FIG. 1 is a schematic view showing the arrangement of a measurement apparatus 100 as an aspect of the present invention. The measurement apparatus 100 measures the shape of an object 5 to be measured based on the principle of triangulation. As shown in FIG. 1, the measurement apparatus 100 includes a projecting unit 1, an imaging unit 3, and a processing unit 4. In the measurement apparatus 100, the projecting unit 1 projects encoded light, that is, pattern light onto the object 5 to be measured, and the processing unit 4 obtains three-dimensional coordinate point data (information on the shape of the object 5 to be measured) of the object 5 to be measured from an image obtained by imaging the pattern light by the imaging unit 3. The processing unit 4 has a function of obtaining the position or posture of the object 5 to be measured by fitting three-dimensional coordinate point data on a preregistered CAD model of the object 5 to be measured.

A systematic error occurring when an object to be measured is a resin in a general measurement apparatus for measuring the shape of an object to be measured based on the principle of triangulation will be explained below with reference to FIG. 13. When an object to be measured is a resin, an image of surface scattered light from the surface of the object and an image of internal scattered light from the interior of the object are formed on (the imaging surface of) an imaging unit, so the measurement result contains a systematic error due to the influence of internal scattering.

Figure 13:
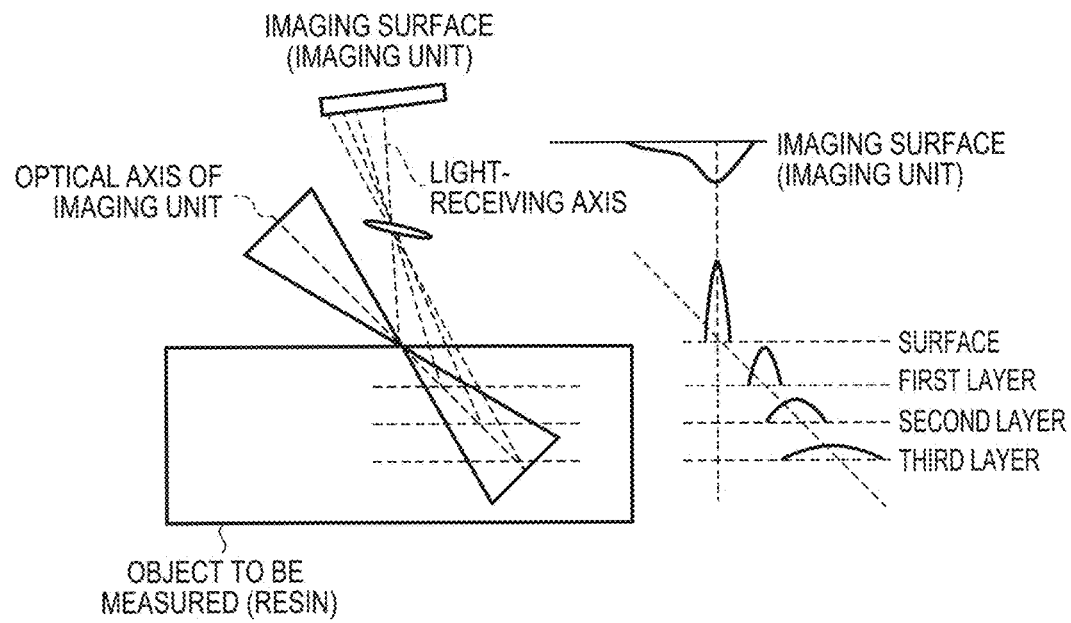
FIG. 13 is a view for explaining the intensity distribution on an imaging surface of light reflected by an object to be measured.

FIG. 13 is a view for explaining the intensity distribution (light intensity distribution) on the imaging surface of light projected onto an object to be measured from a projecting unit, and reflected by the object. The reason why an image of the reflected light from the object to be measured in which internal scattering occurs is formed on the imaging surface will be explained by taking, as an example, a model in which the interior of the object to be measured has a multilayered structure and an image of scattered light from each layer is formed on the imaging surface.

FIG. 13 shows a state in which light projected onto an object to be measured along the optical axis of the projecting unit is scattered and spread inside the object. In a case in which the light is reflected by only the surface of the object, that is, no internal scattering occurs in the object, when light is projected onto the object so as to be condensed in a Gaussian distribution, for example, the intensity distribution on the imaging surface is a symmetrical intensity distribution. On the other hand, when internal scattering occurs in the object, as shown in FIG. 13, images of scattered light from the surface of the object and scattered light from each layer inside the object, that is, the first, second, and third layers are superposed on the imaging surface. Accordingly, when the reflected light from the surface of the object is intense and the reflected light generated by internal scattering gradually weakens in these layers, the intensity distribution on the imaging surface is an asymmetrical intensity distribution.

Assume that the intensity distribution on the imaging surface is classified into surface scattering and internal scattering from an object to be measured. In surface scattering, an image of light condensed to the surface of the object and reflected from it is formed on the imaging surface, so (the width of) the intensity distribution on the imaging surface is narrow. On the other hand, internal scattering spreads light (that is, no light is condensed to any layer of the object), so the intensity distribution on the imaging surface widens. Also, in internal scattering, scattered light of light having entered the object to be measured is obtained on the imaging surface. On the imaging surface, therefore, the peak of internal scattering appears in a position different from that of the peak of surface scattering.

For example, as shown in FIG. 13, the image formation positions on the imaging surface of scattered light from the first, second, and third layers inside the object to be measured have slightly shifted from the image formation position on the imaging surface of scattered light from the surface of the object. Since, therefore, the light intensity distribution formed by internal scattering and that formed by surface scattering are superposed on the imaging surface, an asymmetrical intensity distribution is obtained.

On the other hand, when only surface scattering occurs, the intensity distribution obtained on the imaging surface is only the light intensity distribution formed by surface scattering. Accordingly, the shape of the object to be measured can accurately be obtained by performing, for example, barycenter detection on the intensity distribution. When internal scattering occurs, however, if barycenter detection is simply performed on the asymmetrical intensity distribution, the shape of a position inside the object to be measured is obtained due to the asymmetry of the intensity distribution. As described above, if internal scattering occurs, an error which statistically shifts in the direction of the interior of an object to be measured occurs, that is, a systematic error occurs, so the shape of the object cannot accurately be obtained.

Accordingly, the measurement apparatus 100 of this embodiment implements high-accuracy measurement of the shape of the object 5 to be measured such as a resin by optimally reducing the influence (systematic error) of the asymmetric intensity distribution caused by internal scattering of the object 5 to be measured. In the measurement apparatus 100, pattern light to be projected onto the object 5 to be measured alternately includes bright and dark portions along a first direction. Of an image obtained by imaging the pattern light projected onto the object 5 to be measured, a plurality of first signals different from each other and indicating the intensity distribution in a second direction intersecting the first direction (for example, a direction perpendicular to the first direction) are obtained from regions corresponding to the dark portions of the pattern light. Also, of the image obtained by imaging the pattern light projected onto the object 5 to be measured, a second signal obtained from a region corresponding to the bright portion of the pattern light and representing the intensity distribution in the second direction is corrected by using the plurality of first signals, thereby obtaining a plurality of corrected signals. Then, an evaluation value is obtained for the quality (evaluation) of each of the plurality of corrected signals, and information on the shape of the object 5 to be measured is obtained by using a corrected signal having the evaluation value falling within an allowable range. This makes it possible to optimally reduce the influence of internal scattering from the intensity distribution in the bright portion of the pattern light.

A practical arrangement of the measurement apparatus 100 will be explained in detail below. The projecting unit 1 includes a light source 8, an illumination optical system 9, a mask 10, and a projection optical system 11. The illumination optical system 9 is an optical system for uniformly illuminating the mask 10 with light emitted from the light source 8, for example, illuminates the mask 10 by Koehler illumination. Transmitting regions and light-shielding regions for generating a pattern to be projected onto the object 5 to be measured are formed on the mask 10 by, for example, sputtering chromium on a glass substrate and etching chromium. The projection optical system 11 is an optical system for projecting the pattern of the mask 10 onto the object 5 to be measured.

Figure 2:
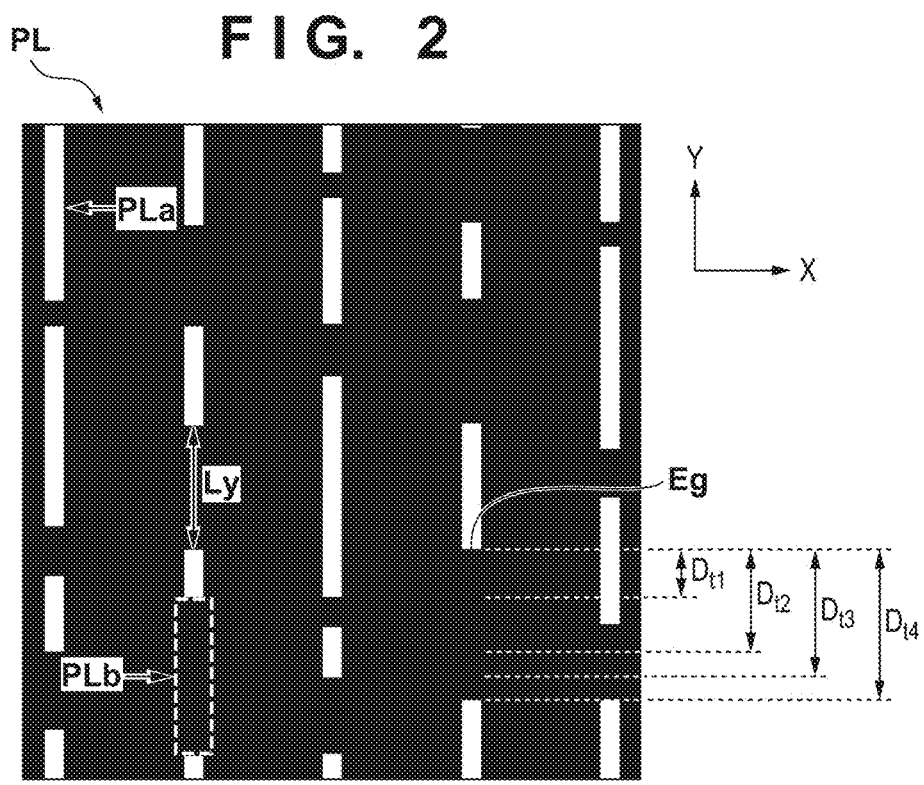
FIG. 2 is a view showing an example of pattern light generated by a mask of the measurement apparatus shown in FIG. 1.

FIG. 2 is a view showing an example of pattern light PL generated by the mask 10. In this embodiment, the mask 10 functions as a generator for generating the pattern light PL in which lines each including bright portions PLa and dark portions PLb along the Y-axis direction (first direction) are periodically arranged in the X-axis direction. Light passing through the transmitting regions of the mask 10 and light shielded by the light-shielding regions of the mask 10 generate the pattern light PL which includes the bright portions PLa and dark portions PLb and is projected onto the object 5 to be measured. In this embodiment, the pattern light PL includes a plurality of dark portions PLb different in length Ly in the Y-axis direction. The dark portion PLb of the pattern light PL functions as an identifying portion for identifying the bright portion PLa, and this identifying portion is formed by a plurality of dots. As described above, the pattern light PL is dot-line pattern light in which the pattern is encoded by the plurality of dark portions PLb arranged at random, that is, by the dots. The encoded dot-line pattern light implements a function as a code for identifying the ordinal number of each line included in an image obtained by the imaging unit 3.

The imaging unit 3 includes an imaging optical system 6 and an imaging element 7, and obtains an image of the pattern light PL projected onto the object 5 to be measured. The imaging optical system 6 is an optical system for forming, on the imaging element 7, an image of the pattern light PL projected onto the object 5 to be measured. The imaging element 7 is an image sensor for converting the pattern light PL imaged on the imaging surface into an image. For example, the imaging element 7 includes a CMOS sensor or CCD sensor.

The processing unit 4 obtains information on the shape of the object 5 to be measured based on the image obtained by the imaging unit 3. In this embodiment, the processing unit 4 associates the lines contained in the image obtained by the imaging unit 3, performs a process of reducing the influence of internal scattering, and then obtains three-dimensional coordinate point data of the object 5 to be measured based on the principle of triangulation.

A measurement process of measuring the shape of the object 5 to be measured in the measurement apparatus 100 will be explained in detail below. First, the length Ly of the dark portion PLb of the pattern light PL has an optimum length which minimizes a systematic error caused by internal scattering. This will be explained below.

Figure 3:
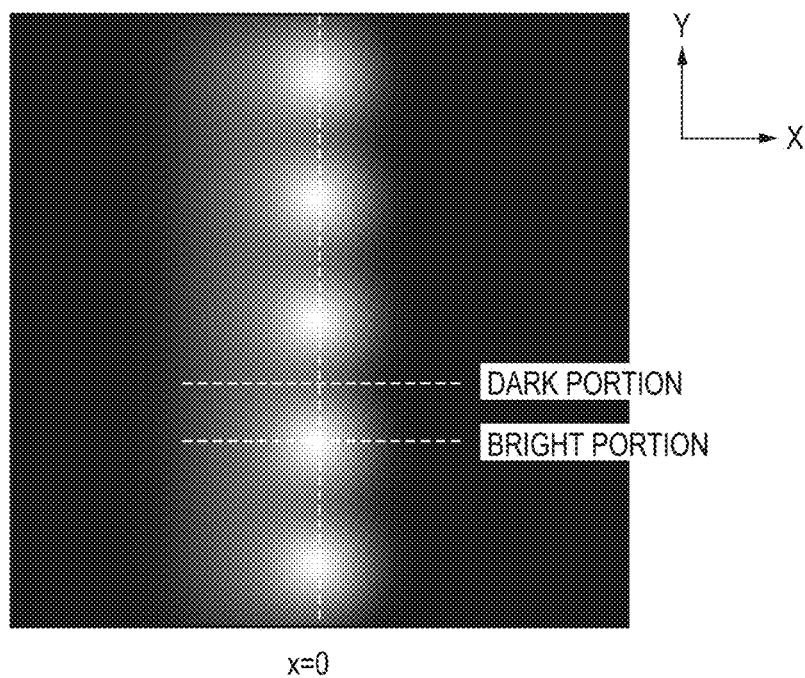
FIG. 3 is a view showing an example of an image obtained by imaging the pattern light.
Figure 4:
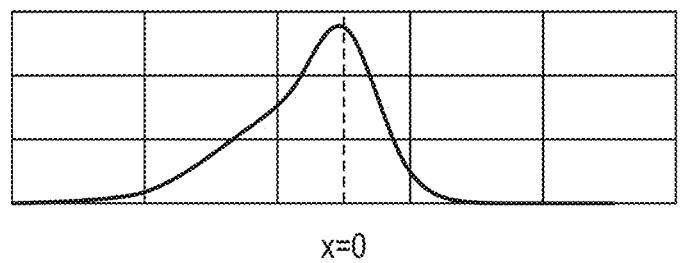
FIG. 4 is a view showing an example of an intensity distribution obtained from a bright portion of the image shown in FIG. 3.

FIG. 3 is a view showing an example of an image obtained by imaging the pattern light PL projected onto a resin as the object 5 to be measured. In this image shown in FIG. 3, a black portion is a low-intensity region, and a white portion is a high-intensity region. A portion where the intensity on X=0 is maximum is a bright portion, and a portion where the intensity on X=0 is minimum is a dark portion. FIG. 4 is a view showing an example of the intensity distribution in the X-axis direction (the second direction perpendicular to the first direction) obtained from the bright portion shown in FIG. 3. This intensity distribution shown in FIG. 4 spreads to the negative side from X=0, and hence is bilaterally asymmetrical in the X-axis direction.

Figure 5:
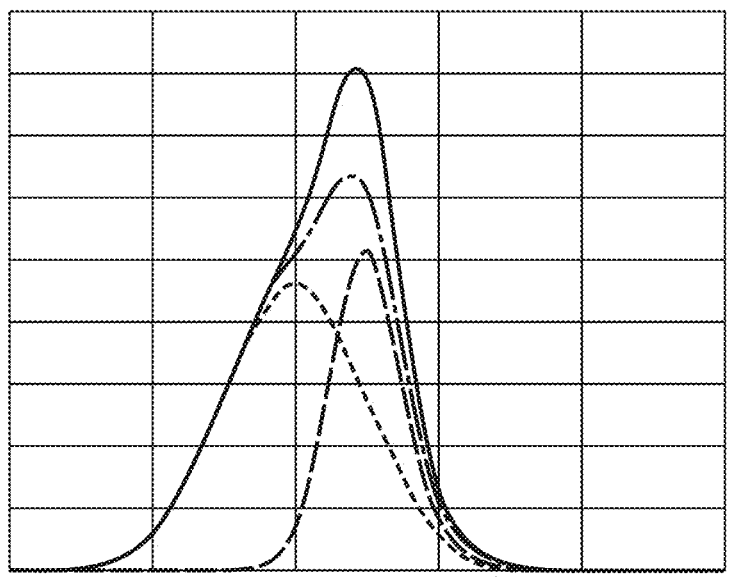
FIG. 5 is a view showing examples of a measurement signal in a bright portion, a surface scattering signal in the bright portion, an internal scattering signal in the bright portion, and a measurement signal in a dark portion.
Figure 6:
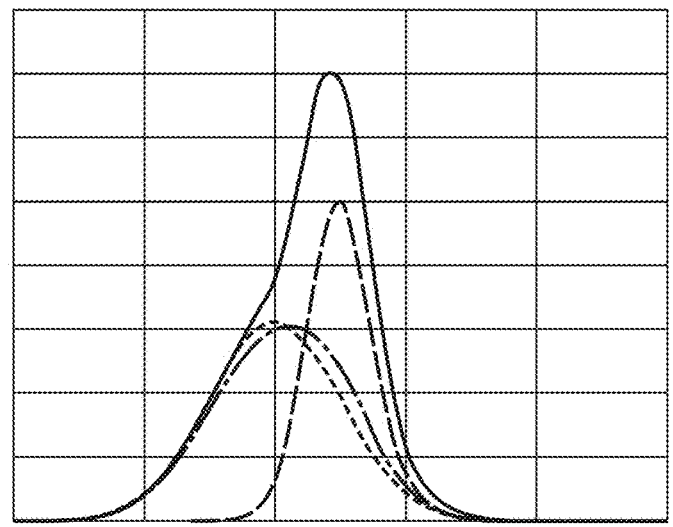
FIG. 6 is a view showing examples of a measurement signal in a bright portion, a surface scattering signal in the bright portion, an internal scattering signal in the bright portion, and a measurement signal in a dark portion.
Figure 7:
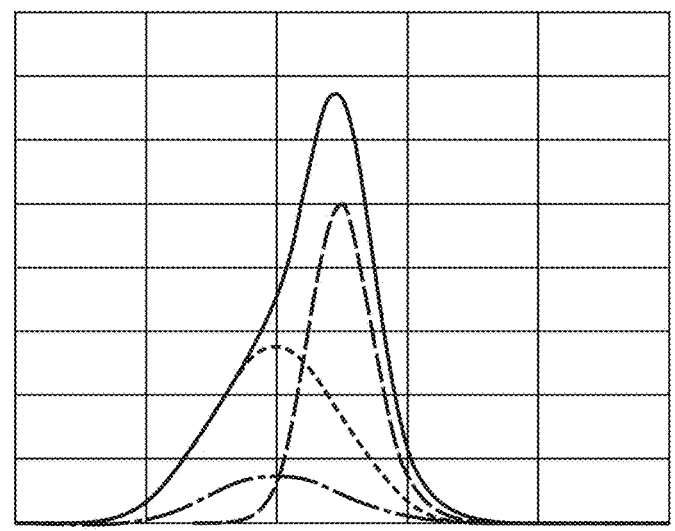
FIG. 7 is a view showing examples of a measurement signal in a bright portion, a surface scattering signal in the bright portion, an internal scattering signal in the bright portion, and a measurement signal in a dark portion.

FIGS. 5, 6, and 7 are views each showing examples of a measurement signal in the bright portion, a surface scattering signal in the bright portion, an internal scattering signal in the bright portion, and a measurement signal in the dark portion, when the length in the Y-axis direction of the dark portion as an interval of the bright portions on X=0 is changed. The measurement signal in the bright portion is a signal (second signal) representing the intensity distribution in the X-axis direction obtained from a region corresponding to the bright portion, more specifically, a central portion of the region in the Y-axis direction. Similarly, the measurement signal in the dark portion is a signal (first signal) representing the intensity distribution in the X-axis direction obtained from a region corresponding to the dark portion, more specifically, a central portion of the region in the Y-axis direction. Also, the surface scattering signal in the bright portion is a signal representing the intensity distribution in the X-axis direction of surface scattered light in the region corresponding to the bright portion. The internal scattering signal in the bright portion is a signal representing the intensity distribution in the X-axis direction of internal scattered light in the region corresponding to the bright portion.

When the dark portion has a specific length in the Y-axis direction, a systematic error contained in a corrected signal obtained by correcting the measurement signal in the bright portion by using the measurement signal in the dark portion is minimized. This will be explained below with reference to FIGS. 5 to 7. Assume that the corrected signal is obtained by calculating the difference between the measurement signal in the bright portion and the measurement signal in the dark portion. Assume also that the length of the dark portion in the Y-axis direction increases in the order of FIGS. 5, 6, and 7. In other words, the length of the dark portion in the Y-axis direction is smallest in FIG. 5, largest in FIG. 7, and intermediate between them in FIG. 6.

Referring to FIG. 5, the measurement signal in the dark portion contains a surface scattering component spatially spread by a point image distribution in the bright portion, in addition to an internal scattering component in the dark portion, because the length of the dark portion in the Y-axis direction is smallest. When subtracting the measurement signal in the dark portion from that in the bright portion, therefore, not only the internal scattering component but also the surface scattering component is subtracted from the measurement signal in the bright portion (that is, it is impossible to subtract only the internal scattering component), so a systematic error occurs.

Referring to FIG. 7, the measurement signal in the dark portion is not larger than the internal scattering signal in the bright portion. This is so because the length of the dark portion in the Y-axis direction is large, so the internal scattered light spatially spreading from the bright portion does not enter the central portion of the dark portion. Accordingly, the corrected signal obtained by subtracting the measurement signal in the dark portion from that in the bright portion does not match the surface scattering signal in the bright portion.

Figure 8:
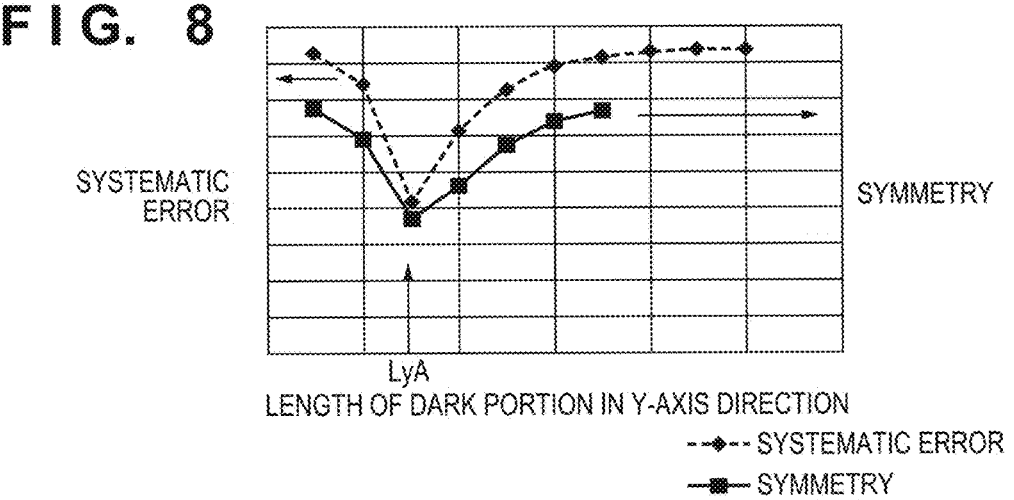
FIG. 8 is a view showing the relationship between the length of a dark portion in the Y-axis direction, a systematic error contained in a corrected signal, and the symmetry of the corrected signal.

Referring to FIG. 6, however, the internal scattering signal in the bright portion and the measurement signal in the dark portion almost match. This makes it possible to appropriately remove the internal scattering component from the measurement signal in the bright portion. The dotted line in FIG. 8 indicates the relationship between the length of the dark portion in the Y-axis direction, and the systematic error contained in the corrected signal obtained by calculating the difference between the measurement signal in the bright portion and that in the dark portion. Referring to FIG. 8, the systematic error contained in the corrected signal is minimum when the dark portion has the length of FIG. 6 in the Y-axis direction, that is, when the dark portion has a length LyA in the Y-axis direction.

As described above, the internal scattering component can optimally be removed from the measurement signal in the bright portion by correcting the measurement signal in the bright portion by using the measurement signal in the dark portion having a specific length in the Y-axis direction. This is so because when correcting the measurement signal in the bright portion by using the measurement signal in the dark portion, an optimal length of the dark portion exists in the Y-axis direction in order to remove the internal scattering component from the measurement signal in the bright portion.

Next, a method of selecting a measurement signal for optimally correcting the measurement signal in the bright portion from measurement signals in a plurality of dark portions having different lengths in the Y-axis direction will be explained. When an image of only surface scattered light is formed on the imaging unit 3 by projecting the pattern light PL onto the object 5 to be measured in which no internal scattering occurs, the intensity distribution obtained by the imaging unit 3 is a symmetrical intensity distribution because there is no internal scattered light.

In this embodiment, an asymmetrical measurement signal representing the intensity distribution in a region corresponding to the bright portion of an image obtained by imaging the pattern light PL projected onto the object 5 to be measured in which internal scattering occurs is corrected by using a measurement signal representing the intensity distribution in a region corresponding to the dark portion of the image. As described above, when the measurement signal in the bright portion is corrected by using the measurement signal in the dark portion having a specific length in the Y-axis direction, the corrected signal represents the intensity distribution of almost surface scattered light alone, so the signal represents a highly symmetrical intensity distribution. In this embodiment, therefore, a corrected signal obtained by calculating the difference between the measurement signal in the bright portion and that in the dark portion is evaluated by using symmetry as an evaluation value (index).

Various evaluation methods exist as a method of evaluating the symmetry of (the waveform) of a signal. For example, the symmetry of a corrected signal can be evaluated from a shift amount between the barycentric position of the corrected signal and a position where the corrected signal has a maximum value, and can also be evaluated from a shift amount between a midpoint position of two positions where the corrected signal has a half value of the maximum value and the position where the corrected signal has the maximum value. It is also possible to evaluate the symmetry of a corrected signal by using skewness (the third moment) as an index of asymmetry in the probability theory or statistics.

The solid line in FIG. 8 indicates the relationship between the length of the dark portion in the Y-axis direction, and the symmetry of the corrected signal obtained by calculating the difference between the measurement signal in the bright portion and that in the dark portion. In FIG. 8, a shift amount between the barycentric position of the corrected signal and a position where the corrected signal has a maximum value is used as the index of symmetry. Referring to FIG. 8, the symmetry of the corrected signal is highest when using dark-portion measurement signal which minimizes the systematic error contained in the corrected signal.

Figure 9:
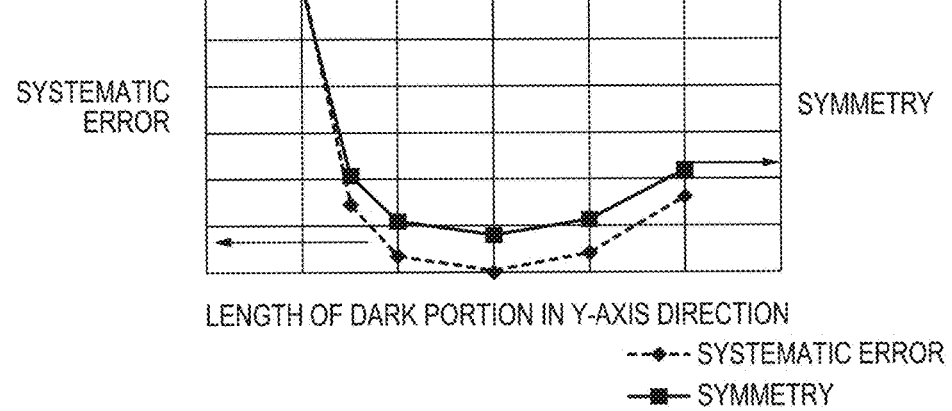
FIG. 9 is a view showing the relationship between the length of a dark portion in the Y-axis direction, a systematic error contained in a corrected signal, and the symmetry of the corrected signal.
Figure 10:
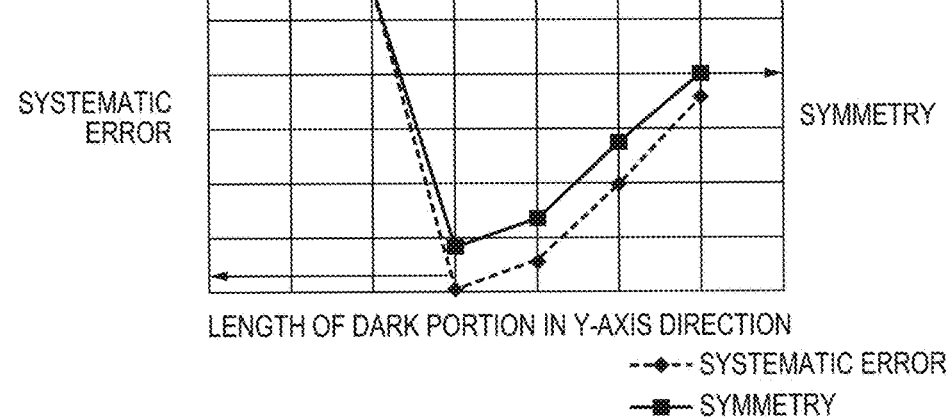
FIG. 10 is a view showing the relationship between the length of a dark portion in the Y-axis direction, a systematic error contained in a corrected signal, and the symmetry of the corrected signal.

FIGS. 9 and 10 are views each showing the relationship between the length of the dark portion in the Y-axis direction, the systematic error contained in the corrected signal, and the symmetry of the corrected signal, for objects to be measured in which different kinds of internal scattering occur. Referring to FIGS. 9 and 10, as in FIG. 8, the symmetry of the corrected signal is highest when using a dark-portion measurement signal which minimizes the systematic error contained in the corrected signal. This tendency of the corrected signal to increase the symmetry when the systematic error contained in the corrected signal is minimum is independent of the type of object to be measured. Accordingly, a dark-portion measurement signal for optimally correcting a bright-portion measurement signal can be selected by evaluating the symmetry of the corrected signal.

The measurement process in the measurement apparatus 100 will be explained with reference to FIG. 11. The processing unit 4 performs this measurement process by comprehensively controlling the individual units of the measurement apparatus 100. Note that an initialization process is performed when the measurement apparatus 100 is activated. This initialization process includes, for example, a process of activating the projecting unit 1 and imaging unit 3, and a process of setting various parameters such as calibration data of the projecting unit 1 and imaging unit 3.

In step S1102, the projecting unit 1 projects the pattern light PL onto the object 5 to be measured. In step S1104, the imaging unit 3 obtains an image of the pattern light PL projected onto the object 5 to be measured.

In step S1106, a corrected signal is obtained based on the image obtained in step S1104. More specifically, a measurement signal (first signal) representing the intensity distribution in the X-axis direction is first obtained from each of a plurality of regions of an image, which correspond to central portions in the Y-axis direction of a plurality of dark portions PLb of the pattern light PL. Similarly, a measurement signal (second signal) representing the intensity distribution in the X-axis direction is obtained from a region of an image, which corresponds to a central portion in the Y-axis direction of one bright portion PLa of the pattern light PL. Then, a plurality of corrected signals are obtained by calculating the differences between the measurement signal in the bright portion PLa and the plurality of measurement signals in the plurality of dark portions PLb.

In step S1108, the symmetry of each of the plurality of corrected signals obtained in step S1106 is obtained as an evaluation value for the quality of the corrected signal. As described previously, the symmetry of the corrected signal can be obtained from a shift amount between the barycentric position of the corrected signal and a position where the corrected signal has a maximum value, and can also be obtained from a shift amount between a midpoint position of two positions where the corrected signal has a half value of the maximum value, and the position where the corrected signal has the maximum value.

In step S1110, a corrected signal having symmetry falling within an allowable range is selected based on the symmetry obtained in step S1108. In this embodiment, a measurement signal in the dark portion PLb corresponding to a corrected signal having the highest symmetry is selected.

In step S1112, a corrected signal is generated by correcting a measurement signal in each bright portion PLa along the Y-axis direction by using the measurement signal in the dark portion PLb selected in step S1110. More specifically, a corrected signal is generated by calculating the difference between the measurement signal in the dark portion PLb selected in step S1110, and each of a plurality of measurement signals obtained from a plurality of regions of an image, which correspond to a plurality of bright portions PLa of the pattern light PL.

In step S1114, three-dimensional coordinate point data of the object 5 to be measured is obtained by using the corrected signal generated in step S1112.

In this embodiment as described above, correction is performed by selecting a measurement signal for optimally correcting the measurement signal in the bright portion PLa, from measurement signals in a plurality of dark portions PLb having different lengths in the Y-axis direction. This makes it possible to reduce the influence of internal scattering in the measurement signal in the bright portion PLa. Accordingly, the measurement apparatus 100 can accurately measure the shape of the object 5 to be measured.

Also, in this embodiment, measurement signals (first signals) are obtained from a plurality of regions of an image, which correspond to a plurality of dark portions PLb having different lengths in the Y-axis direction. However, the present invention is not limited to this. For example, as shown in FIG. 2, the measurement signals (first signals) may also be obtained from a plurality of regions of an image, which correspond to a plurality of portions of the dark portion PLb, which have different distances $Dt_1$ to $Dt_4$ along the Y-axis direction from an edge Eg of the dark portion PLb in the Y-axis direction.

Figure 11:
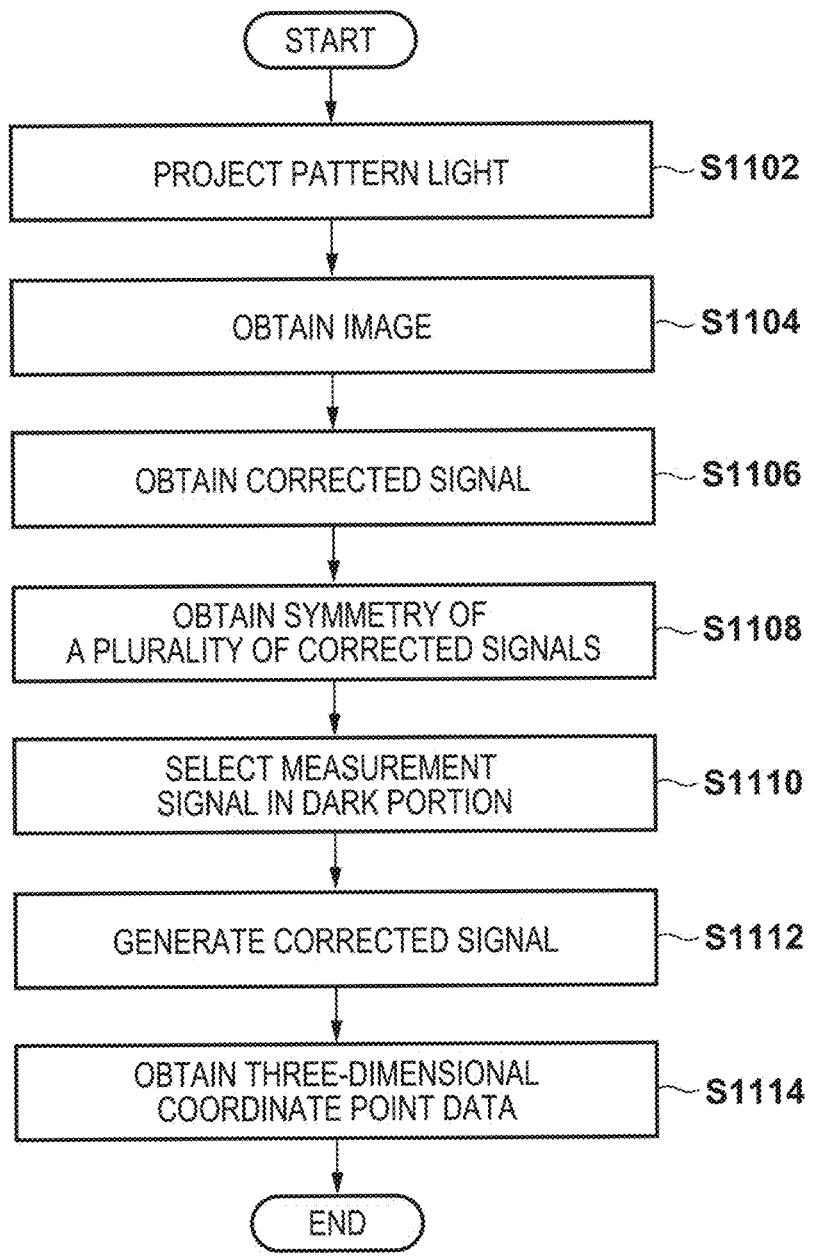
FIG. 11 is a flowchart for explaining a measurement process in the measurement apparatus shown in FIG. 1.

Furthermore, in FIG. 11, the measurement signal (first signal) in the dark portion PLb, which is used to generate a corrected signal, is selected based on the measurement signal (second signal) in one bright portion PLa of the pattern light PL. However, even in one bright portion PLa, the intensity distribution in the X-axis direction, that is, the measurement signal sometimes changes from one position to another in the Y-axis direction. To optimally correct the measurement signal in the bright portion PLa in this case, it is necessary to perform the correction by selecting a measurement signal in the dark portion PLb, which is used to generate a corrected signal, for a measurement signal in each position of the bright portion PLa in the Y-axis direction.

Figure 12:
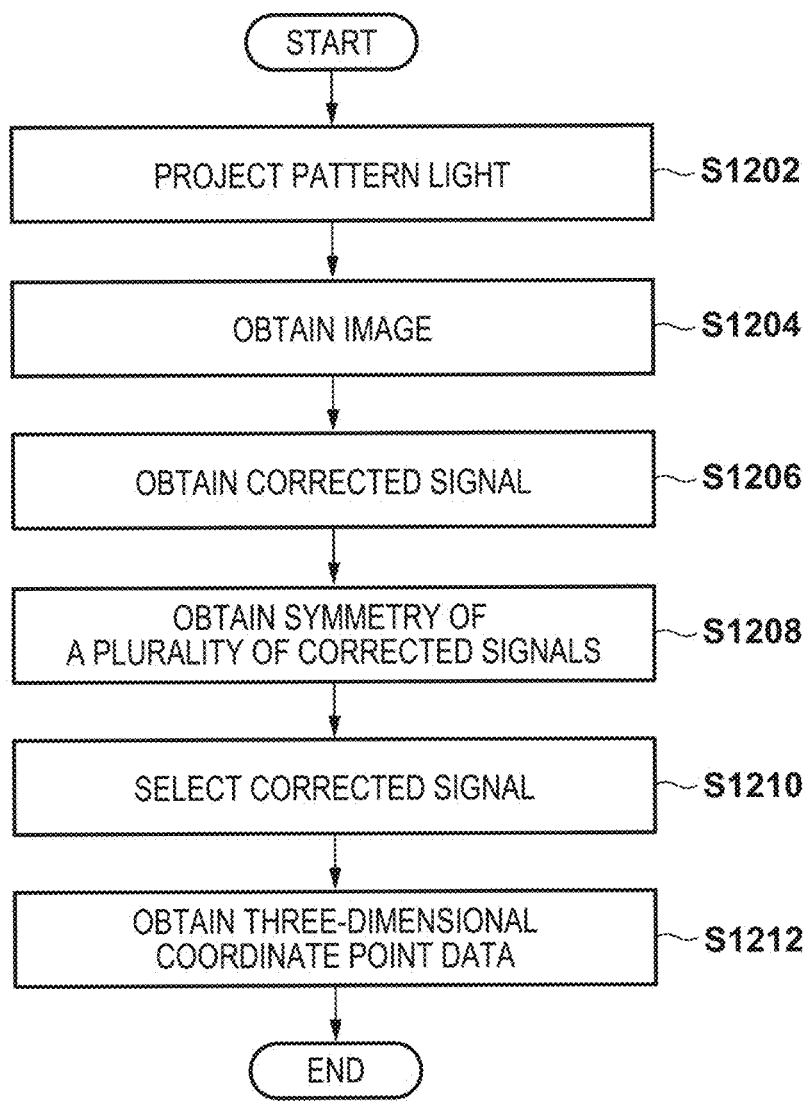
FIG. 12 is a flowchart for explaining a measurement process in the measurement apparatus shown in FIG. 1.

A measurement process when a measurement signal changes from one position to another in the Y-axis direction of one bright portion PLa of the pattern light PL will be explained with reference to FIG. 12. Note that steps S1202 and S1204 shown in FIG. 12 are the same as steps S1102 and S1104 shown in FIG. 11, so a detailed explanation thereof will be omitted.

In step S1206, a corrected signal at each position of one bright portion PLa in the Y-axis direction is obtained based on an image obtained in step S1204. More specifically, a plurality of measurement signals (second signals) are obtained from a plurality of regions of an image, which correspond to a plurality of portions of one bright portion PLa, which are different in distance along the Y-axis direction from the edge of the bright portion PLa in the Y-axis direction. Also, measurement signals (first signals) representing the intensity distribution in the X-axis direction are obtained from a plurality of regions of an image, which correspond to central portions in the Y-axis direction of a plurality of dark portions PLb of the pattern light PL. Then, a plurality of corrected signals are obtained by calculating the differences between the plurality of measurement signals (second signals) at a plurality of positions of the bright portion PLa in the Y-axis direction and the plurality of measurement signals (first signals) in the plurality of dark portions PLb.

In step S1208, the symmetry of each of the plurality of corrected signals obtained in step S1206 is obtained as an evaluation value for the quality of the corrected signal.

In step S1210, for each position of one bright portion PLa in the Y-axis direction, a corrected signal having symmetry falling within an allowable range is selected from the plurality of corrected signals obtained in step S1206 based on the symmetry obtained in step S1208. In this embodiment, a corrected signal having the highest symmetry is selected.

In step S1212, three-dimensional coordinate point data of the object 5 to be measured is obtained by using the corrected signal selected in step S1210.

As described above, even when a measurement signal changes from one position to another in the Y-axis direction in one bright portion PLa, the influence of internal scattering can be reduced by performing correction by using the measurement signal (first signal) in the dark portion PLb, which is optimum for the measurement signal (second signal) in each position.

Other Embodiments

Figure 14:
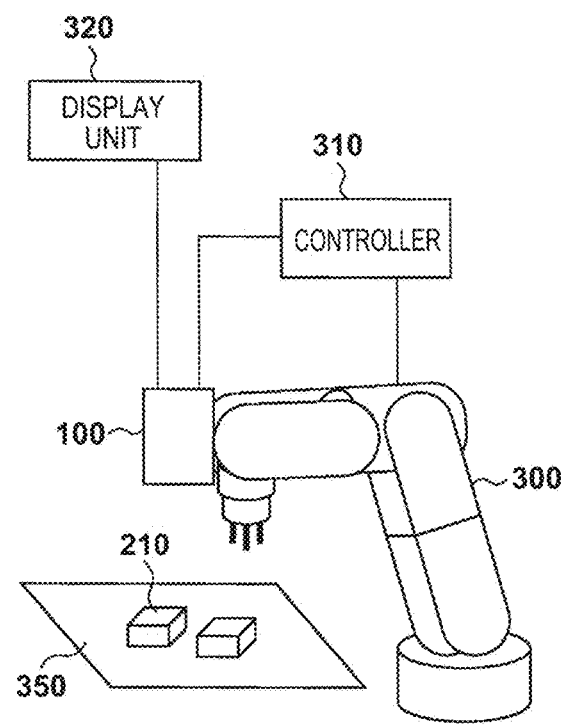
FIG. 14 is a view showing a system including the measurement apparatus and a robot.

The above-described measurement apparatus 100 can be used as it is supported by a given support member. In this embodiment, a control system which is used as it is attached to a robot arm 300 (a holding apparatus) as shown in FIG. 14 will be explained as an example. The measurement apparatus 100 projects pattern light onto an object 210 to be measured placed on a support table 350, and captures an image of the object 210 to be measured. Then, a controller of the measurement apparatus 100 or a controller 310 having obtained image data from the controller of the measurement apparatus 100 obtains the position and posture of the object 210 to be measured, and obtains information on the obtained position and posture. Based on this information on the position and posture, the controller 310 transmits a driving command to the robot arm 300, thereby controlling the robot arm 300. The robot arm 300 holds the object 210 to be measured by using a robot hand (holding unit) or the like at the distal end, and moves the object 210 to be measured by, for example, translating or rotating it. Furthermore, an article including a plurality of parts, for example, an electronic circuit board or machine can be manufactured by assembling the object 210 to be measured to another part by the robot arm 300. It is also possible to manufacture an article by processing the moved object 210 to be measured. The controller 310 includes an arithmetic device such as a CPU and a storage device such as a memory. Note that a controller for controlling the robot may also be installed outside the controller 310. Note also that measurement data and images obtained by the measurement apparatus 100 can be displayed on a display unit 320 such as a display.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application Nos. 2015-111678 filed Jun. 1, 2015, and 2016-087389 filed Apr. 25, 2016, which are hereby incorporated by reference herein in their entirety.

What is claimed is:

1. A measurement apparatus for measuring a shape of an object to be measured, the measurement apparatus comprising:
   a processing unit configured to obtain information on the shape of the object to be measured based on an image obtained by imaging the object to be measured onto which pattern light alternately including a bright portion and a dark portion along a first direction is projected,
   wherein the pattern light includes a plurality of bright portions along the first direction, and
   wherein the processing unit is configured to:
      obtain a plurality of first signals different from each other and indicating a light intensity distribution in a second direction intersecting the first direction, from a region of the image corresponding to the dark portion;
      obtain a plurality of correction signals by calculating differences between the plurality of first signals and a second signal obtained from a region of the image corresponding to one of the plurality of bright portions;
      obtain an evaluation value indicating evaluation of each of the plurality of correction signals, representing a light intensity distribution in the second direction;
      select a first signal, from among the plurality of first signals, corresponding to a correction signal having a highest evaluation value, from among the plurality of correction signals;
      obtain, for a plurality of second signals obtained from a plurality of regions of the image corresponding to the plurality of bright portions, correction signals with the evaluation values falling within an allowable range, from among the plurality of correction signals, by calculating a difference between the second signal and the first signal corresponding to the correction signal having the highest evaluation value; and
      obtain the information using the correction signals having the evaluation value falling within the allowable range, from among the plurality of correction signals.

2. The apparatus according to claim 1, wherein:
   the pattern light includes a plurality of dark portions different in length in the first direction, and
   the processing unit is configured to obtain the plurality of first signals from a plurality of regions of the image corresponding to the plurality of dark portions.

3. The apparatus according to claim 2, wherein the processing unit is configured to obtain the plurality of first signals from a plurality of regions of the image corresponding to central portions of the plurality of dark portions in the first direction.

4. The apparatus according to claim 1, wherein the processing unit is configured to obtain the plurality of first signals from a plurality of regions of the image corresponding to a plurality of portions of the dark portion and having different distances along the first direction from an edge of the dark portion in the first direction.

5. The apparatus according to claim 1, wherein the processing unit is configured to obtain the second signal from a region of the image corresponding to a central portion of the one bright portion in the first direction.

6. A measurement apparatus according for measuring a shape of an object to be measured, the measurement apparatus comprising:
   a processing unit configured to obtain information on the shape of the object to be measured based on an image obtained by imaging the object to be measured onto which pattern light alternately including a bright portion and a dark portion along a first direction is projected,
   wherein the processing unit is configured to:
      obtain a plurality of first signals different from each other and indicating a light intensity distribution in a second direction intersecting the first direction, from a region of the image corresponding to the dark portion;
      obtain a plurality of correction signals by calculating differences between the plurality of first signals and a plurality of second signals obtained from a plurality of regions of the image corresponding to a plurality of bright portions and are different in distance along the first direction from an edge of the bright portion in the first direction;
      obtain an evaluation value indicating evaluation of each of the plurality of correction signals, representing a light intensity distribution in the second direction;
      obtain, for the plurality of bright portions, a correction signal having a highest evaluation value falling within an allowable range, from among the plurality of correction signals; and
      obtain the information using the correction signal having the highest evaluation value falling within the allowable range, from among the plurality of correction signals.

7. The apparatus according to claim 1, wherein the dark portion configures an identifying portion for identifying a line including the bright portion in the pattern light.

8. The apparatus according to claim 7, wherein the identifying portion includes a plurality of dots.

9. The apparatus according to claim 1, wherein the evaluation value includes a value indicating symmetry of a waveform of the correction signal.

10. The apparatus according to claim 1, further comprising:
   a projecting unit configured to project the pattern light onto an object to be measured; and
   an imaging unit configured to obtain the image by imaging the object to be measured onto which the pattern light is projected,
   wherein the processing unit is configured to obtain information on the shape of the object to be measured based on the image obtained by the imaging unit.

11. A calculation method of calculating a shape of an object to be measured, the method comprising:

an image obtaining step of obtaining an image by imaging the object to be measured onto which pattern light alternately including a bright portion and a dark portion along a first direction is projected; and a shape obtaining step of obtaining information on the shape of the object to be measured based on the image, wherein the pattern light includes a plurality of bright portions along the first direction, and wherein the shape obtaining step includes the steps of:
obtaining a plurality of first signals different from each other and indicating a light intensity distribution in a second direction intersecting the first direction, from a region of the image corresponding to the dark portion;

obtaining a plurality of correction signals by calculating differences between the plurality of first signals and a second signal obtained from a region of the image corresponding to one of the plurality of bright portions;

obtaining an evaluation value of each of the plurality of correction signals, representing a light intensity distribution in the second direction;

selecting a first signal, from among the plurality of first signals, corresponding to a correction signal having a highest evaluation value, from among the plurality of correction signals;

obtaining, for a plurality of second signals obtained from a plurality of regions of the image corresponding to the plurality of bright portions, correction signals with the evaluation values falling within an allowable range, from among the plurality of correction signals, by calculating a difference between the second signal and the first signal corresponding to the correction signal having the highest evaluation value; and obtaining the information using the correction signals having the evaluation value falling within the allowable range, from among the plurality of correction signals.

12. A system comprising:

a measurement apparatus configured to measure an object to be measured; and a robot configured to hold and move the object to be measured based on a measurement result from the measurement apparatus, wherein the measurement apparatus is configured to measure a shape of the object to be measured and includes a processing unit configured to obtain information on the shape of the object to be measured based on an image obtained by imaging the object to be measured onto which pattern light alternately including a bright portion and a dark portion along a first direction is projected, wherein the pattern light includes a plurality of bright portions along the first direction, and wherein the processing unit is configured to:
obtain a plurality of first signals different from each other and indicating a light intensity distribution in a second direction intersecting the first direction, from a region of the image corresponding to the dark portion;

obtain a plurality of correction signals by calculating differences between the plurality of first signals and a second signal obtained from a region of the image corresponding to one of the plurality of bright portions;

obtain an evaluation value of each of the plurality of correction signals, representing a light intensity distribution in the second direction;

select a first signal, from among the plurality of first signals, corresponding to a correction signal having a highest evaluation value, from among the plurality of correction signals;

obtain, for a plurality of second signals obtained from a plurality of regions of the image corresponding to the plurality of bright portions, correction signals with the evaluation values falling within an allowable range, from among the plurality of correction signals, by calculating a difference between the second signal and the first signal corresponding to the correction signal having the highest evaluation value; and obtain the information using the correction signals having the evaluation value falling within the allowable range, from among the plurality of correction signals.

13. A method of manufacturing an article, the method comprising the steps of:

holding and moving an object to be measured by a measurement apparatus using a robot; and manufacturing an article by processing or assembling the moved object to be measured, wherein the measurement apparatus is configured to measure a shape of the object to be measured and includes a processing unit configured to obtain information on the shape of the object to be measured based on an image obtained by imaging the object to be measured onto which pattern light alternately including a bright portion and a dark portion along a first direction is projected, wherein the pattern light includes a plurality of bright portions along the first direction, and wherein the processing unit is configured to:
obtain a plurality of first signals different from each other and indicating a light intensity distribution in a second direction intersecting the first direction, from a region of the image corresponding to the dark portion;

obtain a plurality of correction signals by calculating differences between the plurality of first signals and a second signal obtained from a region of the image corresponding to one of the plurality of bright portions;

obtain an evaluation value of each of the plurality of correction signals, representing a light intensity distribution in the second direction;

select a first signal, from among the plurality of first signals, corresponding to a correction signal having a highest evaluation value, from among the plurality of correction signals;

obtain, for a plurality of second signals obtained from a plurality of regions of the image corresponding to the plurality of bright portions, correction signals with the evaluation values falling within an allowable range, from among the plurality of correction signals, by calculating a difference between the second signal and the first signal corresponding to the correction signal having the highest evaluation value; and obtain the information using the correction signals having the evaluation value falling within the allowable range, from among the plurality of correction signals.

14. The apparatus according to claim 1, wherein the evaluation value includes a value indicating high symmetry of a waveform of the correction signal.

15. A calculation method of calculating a shape of an object to be measured, the method comprising:
 an image obtaining step of obtaining an image by imaging the object to be measured onto which pattern light alternately including a bright portion and a dark portion along a first direction is projected; and
 a shape obtaining step of obtaining information on the shape of the object to be measured based on the image,
 wherein the pattern light includes a plurality of bright portions along the first direction, and
 wherein the shape obtaining step includes the steps of:
  obtaining a plurality of first signals different from each other and indicating a light intensity distribution in a second direction intersecting the first direction, from a region of the image corresponding to the dark portion;
  obtaining a plurality of correction signals by calculating differences between the plurality of first signals and a plurality of second signals obtained from a plurality of regions of the image corresponding to a plurality of bright portions and are different in distance along the first direction from an edge of the bright portion in the first direction;
  obtaining an evaluation value of each of the plurality of correction signals, representing a light intensity distribution in the second direction;
  obtaining, for the plurality of bright portions, a correction signal having a highest evaluation value falling within an allowable range, from among the plurality of correction signals; and
  obtaining the information using the correction signal having the highest evaluation value falling within the allowable range, from among the plurality of correction signals.

16. A system comprising:
 a measurement apparatus configured to measure an object to be measured; and
 a robot configured to hold and move the object to be measured based on a measurement result from the measurement apparatus,
 wherein the measurement apparatus is configured to measure a shape of the object to be measured and includes a processing unit configured to obtain information on the shape of the object to be measured based on an image obtained by imaging the object to be measured onto which pattern light alternately including a bright portion and a dark portion along a first direction is projected, and
 wherein the processing unit is configured to:
  obtain a plurality of first signals different from each other and indicating a light intensity distribution in a second direction intersecting the first direction, from a region of the image corresponding to the dark portion;
  obtain a plurality of correction signals by calculating differences between the plurality of first signals and a plurality of second signals obtained from a plurality of regions of the image corresponding to a plurality of bright portions and are different in distance along the first direction from an edge of the bright portion in the first direction;
  obtain an evaluation value indicating evaluation of each of the plurality of correction signals, representing a light intensity distribution in the second direction;
  obtain, for the plurality of bright portions, a correction signal having a highest evaluation value falling within an allowable range, from among the plurality of correction signals; and
  obtain the information using the correction signal having the highest evaluation value falling within the allowable range, from among the plurality of correction signals.

17. A method of manufacturing an article, the method comprising the steps of:
 holding and moving an object to be measured by a measurement apparatus using a robot; and
 manufacturing an article by processing or assembling the moved object to be measured,
 wherein the measurement apparatus is configured to measure a shape of the object to be measured and includes a processing unit configured to obtain information on the shape of the object to be measured based on an image obtained by imaging the object to be measured onto which pattern light alternately including a bright portion and a dark portion along a first direction is projected,
 wherein the processing unit is configured to:
  obtain a plurality of first signals different from each other and indicating a light intensity distribution in a second direction intersecting the first direction, from a region of the image corresponding to the dark portion;
  obtain a plurality of correction signals by calculating differences between the plurality of first signals and a plurality of second signals obtained from a plurality of regions of the image corresponding to a plurality of bright portions and are different in distance along the first direction from an edge of the bright portion in the first direction;
  obtain an evaluation value indicating evaluation of each of the plurality of correction signals, representing a light intensity distribution in the second direction;
  obtain, for the plurality of bright portions, a correction signal having a highest evaluation value falling within an allowable range, from among the plurality of correction signals; and
  obtain the information using the correction signal having the highest evaluation value falling within the allowable range, from among the plurality of correction signals.

* * * * *